April 8, 1941.  W. L. HANSEN ET AL  2,237,958
CLOCK LUBRICATING AND SILENCING DEVICE
Filed Feb. 14, 1938
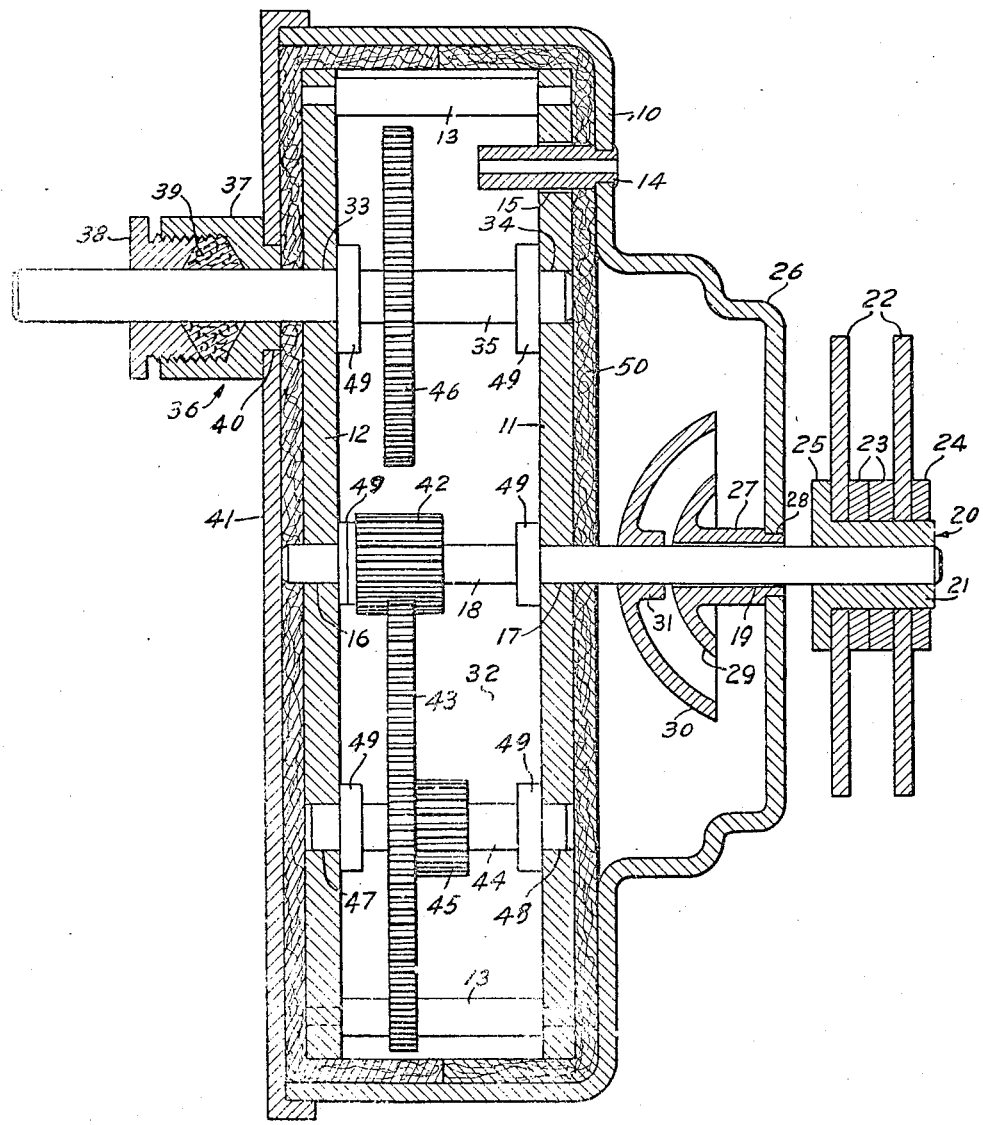
INVENTORS
WILLIAM L. HANSEN,
IRA N. HURST.
ATTORNEYS Patented Apr. 8, 1941

2,237,958

UNITED STATES PATENT OFFICE 2,237,958

CLOCK LUBRICATING AND SILENCING DEVICE

William L. Hansen and Ira N. Hurst, Princeton, Ind., assignors to Hansen Mfg. Company, Inc., Princeton, Ind., a corporation of Indiana Application February 14, 1938, Serial No. 190,377

9 Claims. (Cl. 74—606)

This invention relates to clocks, and particularly to devices for lubricating and silencing the mechanisms of such clocks.

One object of this invention is to provide means for simultaneously lubricating the various bearings of clock mechanisms, and at the same time to provide means for muffling the noise made by the clock mechanisms while in operation.

Another object is to provide a clock having the clockworks inclosed either partially or wholly by a layer of material which is capable of acting not only as a silencing material, but also as a wick to convey lubricant to the bearings of the various shafts in the clock mechanism.

Another object is to provide an electrical synchronous clock motor having a reduction gear set in which the gear box containing this gearing is surrounded by material capable of absorbing lubricant from a lubricant supply, and conveying it by a wick-like action to the bearings of the gear shafts within the gear set, this material also serving to muffle noise arising from the operation of the gearing.

The drawing shows a diagrammatic longitudinal section through a gear box connected to the rotor of an electrical synchronous clock motor, wherein a wick-like material surrounds the gearing for simultaneously lubricating it and muffling noise thereof.

In general, the device of this invention consists of a gear box containing intermeshing gearing mounted upon shafts, the bearings of which are formed in spaced plates at the ends of the shafts. The plates are connected to and surrounded by a casing which contains a quantity of lubricant, such as oil. Surrounding the gearing, between the supporting plates and the casing, is a layer of wick-like material extending from the lubricant sump up to the ends of the various shaft bearings. This wick-like material absorbs lubricant and conveys it upwardly to these bearings. It also substantially surrounds the gearing and acts as a sound insulating layer for muffling the noise of the gearing as it operates, under the influence of the clock motor.

Referring to the drawing in detail, there is shown a casing 10 within which are mounted parallel supporting plates 11 and 12, separated by spacing posts 13. The casing 10 is provided with a tube 14 extending into the interior of the housing through the hole 15 in the supporting plate 11, this tube serving for the insertion of lubricant and also as a ventilating aperture.

Formed in the plates 11 and 12 are bearing holes 16 and 17 for supporting spaced portions of the motor shaft 18, one end of which projects outwardly through an aperture 19 and carries a rotor, generally designated 20, on the end outside the casing 10. The form of the rotor 20 is immaterial to the purpose of the invention, but it may consist of a hub 21 having a pair of discs 22 of magnetic material, separated by spacing washers 23 and held in place by a disc or nut 24 urging these parts against the flange 25 on the hub 21. The casing 10 is provided with a forwardly extending portion 26, which serves to contain an oil trap formed by a tubular stationary member 27, secured in the hole 28 in the casing portion 26 and having the aperture 19 through which the motor shaft 18 passes outwardly. The member 27 is provided with convexly dished or flanged portion 29, which is spaced apart from a concaved dished member 30 having a hub 31 mounted upon the shaft 18 for rotation with the rotor 20. Oil escaping along the shaft 18 from the chamber 32, between the supporting plates 11 and 12, encounters the dished member 30 and is thrown outwardly by centrifugal force so that it is prevented from entering the aperture 19 through which the shaft 18 passes outwardly. The devices 29 and 30 for preventing the escape of oil form no part of the present invention, and are described and claimed in copending application, Ser. No. 138,866, filed April 24, 1937.

The supporting plates 11 and 12 are also provided with bearing apertures 33 and 34 for the reception of the output shaft 35, generally known as the one R. P. M. shaft. This shaft communicates with the remainder of the mechanism for moving the hands of the clock, or other timing mechanism, and is frequently provided with a sweep hand which makes one revolution of the dial in one minute. Surrounding the outer end of the output shaft 35 is a stuffing box, generally designated 36, and having a fixed member 37 within which is threaded an adjustable member 38 so as to compress a packing 39 therebetween, and surrounding the shaft 35. The stuffing box 36 is mounted in a hole 40, provided in a cover plate 41 serving to cover the open side of the casing 10.

It will be understood that the gearing within the casing 10 and supported between the supporting plates 11 and 12 may be of any character requiring lubrication, and that the motor shaft 18 is connected with the output shaft 35 through such mechanism. In the drawing only a portion of this mechanism is capable of being shown because certain of the gears and their shafts fall on the adjacent side of the section plane upon which the drawing is taken. Nevertheless, it is understood that an operative connection takes place between the motor shaft 18 and the output shaft 35.

The gearing shown for purposes of example consists of a pinion 42 mounted upon the motor shaft 18 and meshing with a gear 43 mounted upon the shaft 44. The shaft 44 also carries a pinion 45 which meshes with appropriate gearing connecting it operatively with the gear 46, mounted upon the output shaft 35. The shaft 44 is rotatably mounted in the bearing holes 47 and 48 in the supporting plates 12 and 11, respectively. In order to prevent excessive end play, the shafts 18, 35 and 44 are provided with collars 49, mounted thereon and serving to limit the endwise motion between the supporting plates 11 and 12.

Surrounding the gearing mounted between the supporting plates 11 and 12 is a layer of wick-like material 50, arranged to fill the space between this structure and the walls of the casing 10, except for the projecting portion 26 thereof. This material layer 50 may be of woven textile material or of fibrous material, secured in any desired manner to the adjacent structure. The layer 50 surrounds the gearing and serves simultaneously as a sound insulating layer for muffling the noise of the mechanism, and also for conveying lubricant from the sump formed in the bottom of the casing 10 to the various bearings 16, 17, 33, 34, 47 and 48, rotatably supporting the ends of the shafts 18, 35 and 44 in the supporting plates 11 and 12.

The wick-like nature of the material 50 causes it to absorb the oil and raise it to these bearings. At the same time the plates 11 and 12 may be spaced a sufficient distance apart from the adjacent portions of the casing 10 or casing cover 41, so that as thick a layer 50 as is desirable or necessary for adequate lubrication and for sufficient sound insulation may be accommodated. In this manner no dependence is placed upon capillary spacing of adjacent plates or members, as such capillary spacing requires very narrow intervals between adjacent plates. Furthermore, the layer of oil in such capillary spaces serves directly to conduct vibration and sound across the narrow gap between the plates and the casing, whence it is radiated in the form of noise, a disadvantage which is effectively prevented by the construction of the present invention.

As a modification of the present construction, the supporting plates 11 and 12 may be omitted and the shafts journalled directly in the casing 10 or cover plate 41. The lubricating and silencing layer 50 then conveys lubricant to the inner portions of the ends of the shafts instead of the outer portions, as in the preferred construction using the supporting plates 11 and 12. It will be understood that the material layer 50 may be composed of a padding of adsorbent material which is capable of conveying lubricant. Such material, for example, may include felt, blotting paper, cloth or cellulose fiber.

It will be understood that we desire to comprehend within our invention such modifications as come within the scope of the claims and the invention.

Having thus fully described our invention, what we claim as new and desire to secure by Letters Patent is:

1. In a lubricating and silencing structure for mechanisms, a casing having a chamber with mechanism including rotatable elements, and a layer of combined lubricant-conveying and sound-muffling material completely surrounding said chamber whereby to simultaneously convey lubricant from a portion of said casing to substantially all of said rotatable elements and also to muffle the sound of said mechanism.

2. In a lubricant and silencing structure for mechanisms, a casing having a chamber with mechanism including rotatable elements, and a layer of combined lubricant-conveying and sound-muffling material completely lining said chamber adjacent the ends of said elements whereby to simultaneously convey lubricant from a portion of said casing to said rotatable elements and also to muffle the sound of said mechanism.

3. In a lubricating and silencing structure for mechanisms, a casing having a chamber with mechanism including rotatable elements, and a layer of combined lubricant-conveying and sound-muffling material disposed around the entire exterior of said chamber and extending downwardly into the lower portion of said casing whereby to simultaneously convey lubricant from said lower portion of said casing to said rotatable elements and also to muffle the sound of said mechanism.

4. In a lubricating and silencing structure for mechanisms, a casing, a frame therein, mechanism including rotatable shafts having ends rotatably supported in said frame, and a layer of combined lubricant-conveying and sound-muffling material disposed around the entirety of said frame whereby to simultaneously convey lubricant from a portion of said casing to said shafts and also to muffle the sound of said mechanism.

5. In a lubricating and silencing structure for mechanisms, a casing, a frame therein, mechanisms including rotatable shafts having ends rotatably supported in said frame, said frame having a pair of spaced plates for rotatably receiving said shafts, and a layer of combined lubricant-conveying and sound-muffling material disposed around the entirety of said frame whereby to simultaneously convey lubricant from a portion of said casing to said shafts and also to muffle the sound of said mechanism.

6. In a lubricating and silencing structure for mechanisms, a casing, a frame therein, mechanism including rotatable shafts having ends rotatably supported in said frame, and a layer of combined lubricant-conveying and sound-muffling material disposed around the entirety of said frame, at least one end of each shaft being set back from the adjacent edge of the frame to provide a lubricant space between said end and said material layer whereby to simultaneously convey lubricant from said casing to said shafts and also to muffle the sound of said mechanism.

7. In a lubricating and silencing structure for mechanisms, a casing, a frame therein, mechanism including rotatable shafts having ends rotatably supported in said frame, and a layer of combined lubricant-conveying and sound-muffling material disposed around the entirety of said frame, said shafts having collars thereon adapted to engage said frame for reducing end play of said shafts whereby to simultaneously convey lubricant from a portion of said casing to said shafts and also to muffle the sound of said mechanism.

8. In a lubricating and silencing structure for clock mechanisms, a casing containing a frame with clockwork supported thereby and spaced apart therefrom, said clockwork including rotatable shafts having ends journalled in said frame, and a layer of lubricant-conveying material arranged in the space between said frame and said casing whereby to simultaneously convey lubricant from said casing to said shafts and also to muffle the sound of said clockwork.

9. In a lubricating and silencing structure for clock mechanisms, a casing containing a frame with clockwork supported thereby and spaced apart therefrom, said clockwork including rotatable shafts having ends journalled in said frame, and a layer of lubricant-conveying material arranged in the space between said frame and said casing and extending around the major portion of said clockwork downwardly into the lower portion of said casing whereby to simultaneously convey lubricant from said casing to said shafts and also to muffle the sound of said clockwork.

WILLIAM L. HANSEN.
IRA N. HURST.